United States Patent Office 3,355,403
Patented Nov. 28, 1967

3,355,403
SOLVENT SOLUTION OF WATER-INSOLUBLE SALTS OF ALPHA,BETA-ETHYLENICALLY UNSATURATED CARBOXYLIC ADDUCTS WITH FATTY ACID ESTERS OF ALLYL ALCOHOL-VINYL AROMATIC COPOLYMERS
Frank J. Hahn, Springfield, Mass., assignor to Monsanto Company, St. Louis, Mo., a corporation of Delaware
No Drawing. Filed Dec. 14, 1964, Ser. No. 418,299
12 Claims. (Cl. 260—23)

This invention relates to aqueous surface coating compositions. More particularly, it relates to novel organic cosolvents for aqueous coating compositions based upon adducts of alpha,beta-ethylenically unsaturated carboxylic compounds with the fatty acid esters of copolymers of styrene monomers and allyl alcohol monomers.

In co-pending application S.N. 248,294, filed December 31, 1962 now abandoned, there are disclosed and claimed aqueous surface coating compositions of salts of adducts of alpha,beta-ethylenically unsaturated carboxylic compounds and fatty acid esters of copolymers of styrene monomers and allyl alcohol monomers. The use of water alone, however, leads to the formation of emulsions which do not provide satisfactory coatings. The use of an organic cosolvent to provide homogeneous coating solutions is disclosed in said application and several functionally satisfactory organic cosolvents are listed therein. However, it has been determined that the cosolvents conventionally used in commercial aqueous surface coating compositions are either too toxic for applications where inhalation or skin contact are a factor or are not suitable for use with these adducts of esters of styrene-allyl alcohol copolymers.

It is, therefore, an object of this invention to provide novel organic cosolvents for use with aqueous solutions of salts of adducts of alpha,beta-ethylenically unsaturated carboxylic compounds and fatty acid esters of copolymers of styrene monomers and allyl alcohol monomers.

A further object is the provision of a novel class of relatively non-toxic organic cosolvents for use with aqueous solutions of salts of adducts of alpha,beta-ethylenically unsaturated carboxylic compounds and fatty acid esters of copolymers of styrene monomers and allyl alcohol monomers.

These and other objects are attained through the provision as organic cosolvents of a class of ethers containing both ether structure and free hydroxyl functions, as hereinafter disclosed.

The following examples are presented in illustration of this invention and are not intended as limitations thereon.

Examples I–II, infra, illustrate the preparation of typical adducts of alpha,beta-ethylenically unsaturated carboxylic compounds with a fatty acid ester of a copolymers of styrene and allyl alcohol.

EXAMPLE I

Part A

Preparation of a soya fatty acid ester of a styrene-allyl alcohol copolymer containing about 53% by weight, based upon total solids, of soya fatty acids: Charge 6550 grams of water white soya fatty acids, 5700 grams of a styrene-allyl alcohol copolymer containing about 5.8 weight percent of hydroxyl groups and 400 grams of xylol to a reaction kettle equipped with a stirrer and a trap-condenser-azeotrope set-up. The reaction mixture is heated according to the following schedule:

| Minutes | Temp., ° C. | Comments |
|---|---|---|
| 0 | 27 | All ingredients Charged. |
| 75 | 140 | Azeotrope Starts. |
| 105 | 170 | 100 ml. water over. |
| 132 | 193 | 200 ml. water over. |
| 195 | 230 | 325 ml. water over. |
| 255 | 250 | 380 ml. water over. |
| 318 | 260 | 400 ml. water over. |
| 375 | 265 | 412 ml. water over. |
| 438 | 265 | 420 ml. water over, Finis. |

A total of about 42.5 grams of xylol are removed with the water. The resulting product contains about 97% esterified solids by weight, the acid number thereof being as determined by Federal Test Method TT–P–1416 Method 5071.

Part B

Preparation of a maleinized adduct of the soya ester prepared in Part A of this example: Add to the product of Part A of this example, 945 grams of maleic anhydride. Subsequently 12.0 grams of iodine predispersed in 115 ml. of xylol are added to the reaction mixture according to the following schedule:

| Minutes | Temp., ° C. | Comments |
|---|---|---|
| 0 | 130 | Ester and Maleic Anhydride. |
| 10 | 140 | Charge Iodine Dispersion. |
| 35 | 170 | |
| 90 | 220 | |
| 195 | 220 | Apply 26 inch of Hg Vacuum. |
| 225 | 198 | 335 ml. volatiles off, stop vacuum. |
| 255 | 160 | Finis. |

The reaction mixture is cooled to about 100° C. and the resulting 97% solids solution is strained through nylon cloth. Analysis shows an acidity of about 1.167 milliequivalents per gram with a free maleic anhydride content of only 0.025 milliequivalents per gram.

EXAMPLE II

Example I is repeated employing 1120 grams of fumaric acid in place of the maleic anhydride employed therein. Substantially equivalent results are obtained.

The following Examples, III–IX, illustrate the preparation of a series of surface coating compositions predicated upon the sodium or dimethyl ethanol amine salt of a maleic adduct of a soya ester of a styrene-allyl alcohol copolymer and using the cosolvents of this invention.

EXAMPLE III

Premix 20 grams of dimethyl ethanol amine and 20 grams of water with 30.8 grams of a 25% by weight aqueous sodium hydroxide solution and then stir this mixture, at 75° C., into 397 grams of the maleic adduct prepared in Example I, Part B. Then add 184 grams of a 1:1 by weight mixture of 1-(n-propoxy)-propan-2-ol and 2-(n-propoxy)-propan-1-ol. Finally, add 323 grams of water. The resulting clear aqueous system (which may be characterized as being an aqueous vehicle solution) has a 23° C. viscosity of about 9,100 cps. and contains about 40% solids by weight.

EXAMPLE IV

Premix 20 grams of dimethyl ethanol amine and 20 grams of water with 30.8 grams of a 25% by weight aqueous sodium hydroxide solution and then stir this mixture, at 75° C., into 397 grams of the maleic adduct prepared in Example I, Part B. Then add 37 grams of butyl Carbitol (i.e., butoxyethoxyethanol) and 147 grams of a 1:1 by weight mixture of 1-(n-propoxy)-propan-2-ol and 2-(n-propoxy)-propan-1-ol. Finally, add 323 grams of water. The resulting clear aqueous system has a 23° C. viscosity of 8,600 cps. and contains about 40% solids by weight.

EXAMPLE V

Premix 20 grams of dimethyl ethanol amine and 20 grams of water with 30.8 grams of a 25% by weight aqueous sodium hydroxide solution and then stir this mixture, at 75° C., into 397 grams of the maleic adduct prepared in Example I, Part B. Then add 37 grams of 1-butoxy-ethoxy-2-propanol (hereinafter called BEP in Tables A and B) and 147 grams of 2-(n-propoxy)-propan - 1 - ol. Finally, add 323 grams of water. The resulting clear aqueous system contains about 40% solids by weight.

EXAMPLE VI

Premix 20 grams of dimethyl ethanol amine and 20 grams of water with 30.8 grams of a 25% by weight aqueous sodium hydroxide solution and then stir this mixture, at 75° C., into 397 grams of the maleic adduct prepared in Example I, Part B. Then add 184 grams of 1-(n-propoxy)-propan - 2 - ol. Finally, add 323 grams of water. The resulting clear aqueous system contains about 40% solids by weight.

EXAMPLE VII

Premix 20 grams of dimethyl ethanol amine and 20 grams of water with 30.8 grams of a 25% by weight aqueous sodium hydroxide solution and then stir this mixture, at 75° C., into 397 grams of the maleic adduct prepared in Example I, Part B. Then add 37 grams of butyl Carbitol (i.e., butoxy ethoxy ethanol) and 147 grams of a 1:1 by weight mixture of 1-(n-butoxy)-propan-2-ol and 2-(n-butoxy)-propan-1-ol. Finally, add 323 grams of water. The resulting clear aqueous system contains about 40% solids by weight.

EXAMPLE VIII

Premix 20 grams of dimethyl ethanol amine and 20 grams of water with 30.8 grams of a 25% by weight aqueous sodium hydroxide solution and then stir this mixture, at 75° C., into 397 grams of the maleic adduct prepared in Example I, Part B. Then add 184 grams of 1-(n-butoxy)-propan-2-ol. Finally, add 323 grams of water. The resulting clear aqueous system contains about 40% solids by weight.

EXAMPLE IX

Premix 20 grams of dimethyl ethanol amine and 20 grams of water with 30.8 grams of a 25% by weight aqueous sodium hydroxide solution and then stir this mixture, at 75° C., into 397 grams of the fumaric adduct prepared in Example II. Then add 184 grams of 2-(n-butoxy)-propan-1-ol. Finally, add 323 grams of water. The resulting clear aqueous system contains about 40% solids by weight.

The following Examples, X–XI, illustrate the preparation of a series of gloss and semi-gloss enamel formulations from the surface coating composition of Examples III–IX.

EXAMPLE X

A series of gloss enamel formulations are prepared using each of the surface coating compositions of Examples III–IX, as follows. In a stirred kettle combine, at room temperature, 250 grams of the clear aqueous adduct solution (e.g., prepared in each of Examples III–IX), and 250 grams of rutile titanium dioxide pigment and mill until homogeneous. Then add another 400 grams of the adduct solution and 225 grams of water, mixing between each addition. Finally 5 grams of cobalt (6%) Cyclodex dissolved in 5 grams of water and 7.5 grams of calcium (4%) Nuolate are added and the mixture is stirred until homogeneous. The resulting gloss enamel formulation contains about 45% solids by weight. For each gloss enamel formulation, a film of about 0.001″ thickness is applied to a steel panel and allowed to air dry. The time in which the film is dry to the touch, the tackiness at 4, 6 and 24 hours after deposition of the film, the brushability and washability, and, finally, the 24-hour recoat lift is determined for each film and the results reported in Table A, infra.

TABLE A

| Adduct Solution of Ex. | Dry to Touch (Hours) | Print Free (Hours) | Brushability | 24 Hour Recoat Lift | Cosolvent | |
|---|---|---|---|---|---|---|
| | | | | | Of This Invention | Auxiliary |
| III | 1 | 4 | Fair | None | 1-(n-propoxy)-propan-2-ol / 2-(n-propoxy)-propan-1-ol | None. |
| IV | 2 | 8 | Very Good | do | 1-(n-propoxy)-propan-2-ol / 2-(n-propoxy)-propan-1-ol | Butyl Carbitol. |
| V | 2.5 | 10 | Very Good | do | 2-(n-propoxy)-propan-1-ol | BEP. |
| VI | 1 | 4 | Fair | do | 1-(n-propoxy)-propan-2-ol | None. |
| VII | 3 | 11 | Very Good | Moderate | 1-(n-butoxy)-propan-2-ol / 1-(n-butoxy)-propan-1-ol | Butyl Carbitol. |
| VIII | 2 | 6 | Good | Slight | 1-(n-butoxy)-propan-2-ol | None. |
| IX | 2 | 6 | do | do | 2-(n-butoxy)-propan-1-ol | Do. |

EXAMPLE XI

A series of semi-gloss enamel formulations are prepared using each of the surface coating compositions of Examples III–IX, as follows. In a stirred kettle combine, at room temperature, 250 grams of the clear aqueous adduct solution (e.g., prepared in each of Examples III–IX), 250 grams of rutile titanium dioxide pigment and 100 grams of talc powder and mix until homogeneous. Then add another 400 grams of the adduct solution and 225 grams of water, mixing between each addition. Finally 5 grams of cobalt (6%) Cyclodex dissolved in 5 grams of water and 7.5 grams of calcium (4%) Nuolate are added and the mixture is stirred until homogeneous. The resulting gloss enamel formulation contains about 50% solids by weight. For each gloss enamel formulation, a film of about 0.001″ thickness is applied to a steel panel and allowed to air dry. The time in which the film is dry to the touch, the tackiness at 4, 6 and 24 hours after deposition of the film, the brushability and washability, and, finally, the 24-hour recoat lift is determined for each film and the results reported in Table B, infra.

TABLE B

| Adduct Solution of Ex. | Dry to Touch (Hours) | Print Free (Hours) | Brushability | 24 Hour Recoat Lift | Cosolvent Of This Invention | Auxiliary |
|---|---|---|---|---|---|---|
| III | 0.75 | 3 | Fair | None | 1-(n-propoxy)-propan-2-ol<br>2-(n-propoxy)-propan-1-ol | None. |
| IV | 1.5 | 7 | Very Good | do | 1-(n-propoxy)-propan-2-ol<br>2-(n-propoxy)-propan-1-ol | Butyl Carbitol. |
| V | 2 | 9 | do | do | 2-(n-propoxy)-propan-1-ol | BEP. |
| VI | 0.75 | 3 | Fair | do | 1-(n-propoxy)-propan-2-ol | None. |
| VII | 2.5 | 10 | Very Good | do | 1-(n-butoxy)-propan-2-ol<br>2-(n-butoxy)-propan-1-ol | Butyl Carbitol. |
| VIII | 1.5 | 5 | Good | Slight | 1-(n-butoxy)-propan-2-ol | None. |
| IX | 1.5 | 5 | do | do | 2-(n-butoxy)-propan-1-ol | Do. |

Study of Examples III–XI and particularly Tables A and B reveals that the organic cosolvents of this invention provide superior surface coating compositions in addition to being non-toxic.

The fatty acid esters of copolymers of styrene monomers and allyl alcohol monomers employed are limited in several regards. For purposes of clarity these limitations may be treated separately, as follows, with respect to (a) characterization of the styrene-allyl alcohol copolymers from which they are derived, (b) characterization of the fatty acids from which they are derived and (c) definition of the relative proportion of styrene-allyl alcohol copolymer to fatty acid which may be employed.

The styrene-allyl alcohol copolymer will, in actual practice, most probably be a copolymer of styrene and allyl alcohol due to the ready availability of these monomers. However, it has been found that the styrene moiety present in the copolymers employed in the examples may be replaced, with equivalent results being obtained, by substituted styrenes such as, for example, alpha-alkyl styrenes, e.g., alpha-methyl styrene, alpha-ethyl styrene, etc.; ring-substituted alkyl styrenes, e.g., ortho-, meta- and para-methyl, ethyl, butyl, etc., styrenes, 2,3- and 2,4- dimethyl and diethyl styrenes; halo styrenes, e.g., mono-, di- and trichlorostyrenes, alpha-chloro styrene, 2,4-dibromostyrene, etc.; haloalkyl styrenes, e.g., 4-chloro-alphamethyl styrene, 2-bromo-4-methyl styrene, etc. Mixtures of such styrene monomers may be present in combined form in the copolymer employed, if desired. Similarly, the allyl alcohol moiety present in the copolymers employed in the examples may be replaced, with equivalent results being obtained, by substituted allyl alcohols such as, for example, methallyl and chlorallyl alcohols. Mixtures of such allylic monomers may be present in combined form in the copolymers employed, if desired.

While the prior art, as exemplified by U.S. Patents 2,588,890, 2,630,430, 2,894,938 and 2,940,946, quite adequately describes these styrene-allyl alcohol copolymers and methods for their preparation, in a preferred embodiment copolymers containing from about 5.0 to 8.0 weight percent of hydroxyl groups have been found to provide superior results and are employed. In a further preferred embodiment, the relatively homogeneous copolymers prepared as taught in U.S. Patent 2,940,946.

The fatty acids with which the styrene-allyl alcohol copolymer are esterified should have an unsaturation as measured by iodine number using the ASTM D1467–57T method of from about 50 to 220 and, more preferably, about 125 to 200. Thus, whether the fatty acid employed be a relatively pure unsaturated fatty acid or a mixture of fatty acids such as are commercially available, e.g., derived from natural vegetable, protein or animal oils, the total fatty acids employed should have an iodine number as above limited. It is, therefore, apparent that virtually any saturated or unsaturated fatty acid or commercial mixture of fatty acids may be employed with the sole proviso that if the mass chosen does not have an iodine number within the designated range, or of a predetermined desired value, a sufficient proportion of compensating fatty acid should be added to adjust the iodine number to the desired level.

In a preferred embodiment the proportions of saturated fatty acids and of conjugated unsaturated fatty acids in the total fatty acid employed are kept below 35 weight percent of each; the best results being obtained maintaining the proportion of saturated and conjugated unsaturated fatty acids below 10 weight percent of each type. Non-fatty monobasic acids such as, for example, rosin acids, benzoic acids, etc. may be substituted for fatty acids in proportions not exceeding 20% of the total acids used.

Within the foregoing frame of reference it is, therefore, obvious that one may employ unsaturated fatty acids such as, for example, $\Delta^{9,10}$-decylenic acid, $\Delta^{9,10}$-dodecylenic acid, palmitoleic acid, oleic acid, ricinoleic acid, petroselenic acid, vaccenic acid, linoleic acid, linolenic acid, eleostearic acid, licanic acid, parinaric acid, tariric acid, gadoleic acid, arachidonic acid, cetoleic acid, erucic acid, selacholeic acid, etc.; mixtures of unsaturated fatty acids as obtained by the hydrolysis of drying and semi-drying oils such as, for example, acorn oil, beechnut oil, Brazil nut oil, chaulmoogra oil, corn oil, cottonseed oil, croton oil, hemp seed oil, linseed oil, oiticica oil, perilla oil, poppy seed oil, sesame oil, soybean oil, safflower oil, sunflower oil, tall oil, tung oil, menhaden oil, sardine oil, walnut oil, dehydrated castor oil, etc.; saturated fatty acids such as, for example, capric acid, lauric acid, myristic acid, palmitic acid, stearic acid, arachidic acid, behenic acid, lignoceric acid, etc.; and mixtures of saturated fatty acids as obtained by the hydrolysis of non-drying oils such as, for example, coconut oil, babassu oil, palm oil, olive oil, castor oil, peanut oil, rape oil, etc.

Finally, with regard to the characterization of the fatty acid esters of styrene-allyl alcohol copolymers which may be employed, it has been found that the presence of more than a small amount of free hydroxyl groups in the esterified copolymer interferes with proper adduction of the unsaturated carboxylic acid, resulting in a competing esterification reaction with said carboxylic acid and in premature gelation of the reaction system. On the other hand, the presence of significant amounts of free fatty acid in the final adducted product has been found to cause foaming and form interfering concentrations of soap during the subsequent formulation of, e.g., water-based, surface coating compositions, therefore, it has been found that from about 0.75 to 1.25 and preferably from about 1.13 to 1.17, carboxyl equivalents of the fatty acid should be employed perhydroxyl equivalent of the styrene-allyl alcohol copolymer.

When linseed acids, soya acids or other fatty acids of substantially equivalent acid number are used in conjunction with a styrene-allyl alcohol copolymer containing about 5.0 to 8.0 weight percent hydroxyl groups, esters prepared using about 38 to 62 weight percent of fatty acid and, correspondingly, about 62 to 38 weight percent of styrene-allyl alcohol copolymer have been found to eventuate in superior surface coating compositions.

During the preparation of the fatty acid esters of the styrene-allyl alcohol copolymers, a small amount of a hydrocarbon solvent is usually employed to maintain a flowable reaction system. In many instances substantially more solvent may be employed without seriously affecting the practice of this invention. In commercial practice, it is most probable that the fabricator of the surface coating compositions will prepare his own fatty acid esters and then form the adduct as hereinafter taught.

Any ethylenically unsaturated carboxylic acid, anhydride or a partial ester thereof, containing the structure

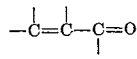

may be employed in forming the adducts. Anhydrides are preferably employed. However, to avoid redundancy the term "acid" as hereinafter employed in naming specific examples of useful compounds and in otherwise referring to these compounds shall be understood to include and refer to the corresponding anhydride where possible as well as to the partial esters. Thus, in place of the maleic and fumaric acids employed in the examples, one may employ, with equivalent results, monocarboxylic acids such as, for example, acrylic acid, methacrylic acid, crotonic acid, isocrotonic acid, vinyl acetic aid, ethacrylic acid, dimethyl acrylic acid, teracrylic acid, angelic acid, tiglic acid, etc. and polycarboxylic acids such as, for example, itaconic acid, citraconic acid, chloromaleic acid, mesaconic acid, aconitic acid, etc.

As aforesaid, in the case of polycarboxylic acids, the partial, e.g., not exceeding one-half, esters thereof with 1–10 carbon atom alcohols may be employed. Examples thereof include mono-methyl maleate, mono-butyl fumarate, mono-butyl maleate, mono-decyl maleate, monobenzyl maleate, etc.

In preparing the adducts, up to a stoichiometric proportion of the ethylenically unsaturated carboxylic acid with respect to the esterified styrene-allyl alcohol copolymer is employed, equating the unsaturation in the esterified copolymer as measured by the total iodine number thereof, using in this instance ASTM D1541–58T, with the unsaturation in the ethylenically unsaturated carboxylic acid.

In preparing the adducts, the esterified styrene-allyl alcohol copolymer and the ethylenically unsaturated carboxylic acid are combined in a suitable reaction vessel, preferably equipped with a reflux condenser and means for charging materials during reaction. Adduction is effected at temperatures of from about 50° C. to reflux, and more preferably at from about 100° C. to reflux, until substantially all of the ethylenically unsaturated carboxylic compound has been consumed. The presence of an organic solvent during adduction does not interfere except insofar as the particular solvent employed may not, at the reaction pressure employed, permit the reaction temperature to approach reaction conditions or maintain the reactive materials in a physical state permitting effective co-reaction.

Although not necessary to the practice of this invention, it has been found advantageous to effect the adduction in the presence of a small proportion of iodine; for example, up to about 2 weight percent, based upon the total weight of esterified styrene-allyl alcohol copolymer and ethylenically unsaturated carboxylic acid. The function of the iodine during adduction is to lighten the color of the resulting product and also to depress the molecular weight of the product so as to retain a lower viscosity and avoid gelation. This function is unusual in this art since the normal use of iodine is to catalyze reaction with conjugated unsaturation. In the systems of this invention, however, there may be very little, if any, conjugation. Thus, while no iodine need be employed, it has been found that the adducted product contains a level of color which may be found to be objectionable in certain instances. More importantly, however, when iodine is not used, the adduction reaction should be more carefully controlled so as to avoid gelation. The use of too much iodine, on the other hand, has been found to decrease the chemical, or hydrolysis, resistance of films prepared from the adducted product. Generally, the iodine is predispersed in a solvent and charged to the reaction system along with the ethylenically unsaturated carboxylic acid, but may be added during the adduction reaction, if desired, but at some sacrifice in efficacy.

As heretofore mentioned, the adduction reaction may be effected in the optional presence of an organic solvent. Generally, up to 10% by weight, based upon total solids, of a non-reactive organic solvent will provide a suitable reaction mixture. However, significantly more solvent may be employed, if desired, provided the solvent is preselected so as to be either water-miscible or capable, in the proportion used, of forming aqueous solutions when the water and a water-miscible organic cosolvent are charged. Varsol, xylol, toluene, isobutyl ketone, etc. have been found to be excellent media in which the adduction may be effected.

In preparing the aqueous surface coating compositions of this invention, the above-described adducts are rendered soluble and then converted into the aqueous system. The adducts are rendered soluble by conversion into their salt form. To achieve this, it is sufficient that the adduct be admixed with an alkali metal base, ammonia or amine, in the presence of water, in sufficient proportion to neutralize a sufficient proportion of carboxylic groups on the adduct to render it soluble in the presence of minor amounts of the water-miscible organic cosolvents of this invention. Sufficient water and organic cosolvent are then added to adapt to the desired percent solids level within commercially acceptable ranges; e.g., 40±20% solids for paint manufacture. Generally, the proportion of organic cosolvent will be from 10 to 40 parts by weight, and preferably 15 to 30 parts, per 100 parts by weight of water and said organic cosolvent combined. From 10 to 100 parts by weight, and preferably 15 to 50 parts, of the adduct are employed per 100 parts of the solvent mixture; i.e., water plus organic cosolvent.

Examples of suitable bases which may be employed with equivalent results in place of the sodium hydroxide and dimethyl ethanol amine used in the examples to convert the adducts to their water-soluble salts are other alkali metal bases such as lithium hydroxide, sodium carbonate, potassium hydroxide, rubidium hydroxide, cesium hydroxide, etc., primary, secondary and tertiary amines and alkanol amines such as, e.g., morpholine, methylamine, dimethylamine, trimethylamine, diethylamine, methylethylamine, n-propylamine, n-hexylamine, laurylamine, ethanolamine, diethanolamine, aniline, etc., ammonia, etc.

The organic cosolvents of this invention are the etherification products of (a) n-propanol or n-butanol with (b) propylene glycol or propylene oxide having the following structure:

(a)

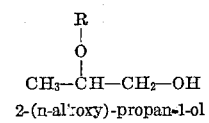

or (b)

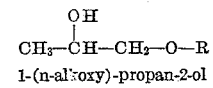

wherein R is either n-propyl or n-butyl. The organic cosolvent may be, therefore, 2-(n-propoxy)-propan-1-ol, 2-(n-butoxy)-propan-1-ol, 1-(n-propoxy)-propan - 2 - ol, or 1-(n-butoxy)-propan-2-ol. Mixtures of these may be used.

As commercially obtained, the organic cosolvents of this invention, described in the previous paragraph, may be present in combination with a minor proportion of the completely etherified, i.e., no hydroxyl function left, reaction products, i.e., 1,2-di-(n-propoxy)-propane or 1,2-di-(n-butoxy)-propane. Similarly, there may also be present in minor proportions the similar etherification products, either partial or complete, of n-propanol or n-butanol with dipropylene glycol or dipropylene oxide. While the compounds mentioned in this paragraph are not the cosolvents of this invention they may be present in minor proportion, without adverse effect, in admixture with the same.

As shown in the working examples, the organic cosolvents of this invention may be used alone or in conjunction with a minor proportion of conventional cosolvents mentioned in the prior art. Such auxiliary cosolvents are toxic and should, therefore, be held to a low proportion in order to avoid a potential health hazard.

In the formulation of the water-based surface coating compositions of this invention any of the conventional paint, primer, varnish, etc. additives may be used; for example, pigments, driers, stabilizers, defoamers, etc. Other film forming resinous systems may also be employed in combination such as, for example, epoxy resins, alkyds, rubber-based latex compositions, etc.

It is obvious that many variations may be made in the products and processes of this invention without departing from the spirit and scope thereof.

What is claimed is:

1. A coating composition comprising:
   (A) from 10 to 100 parts by weight of a water-insoluble salt of an adduct of (1) an alpha,beta-ethylenically unsaturated carboxylic compound and (2) a fatty acid ester of a copolymer of a styrene monomer and an allyl alcohol monomer having the structure of a co-reaction product of (a) from 0.75 to 1.25 carboxyl equivalents of fatty acid and mixtures thereof having an iodine unsaturation number by the ASTM D1467–57T test method of from about 50 to 220 and (b) 1.0 hydroxyl equivalents of a copolymer of a styrene monomer and an allyl alcohol monomer, and
   (B) 100 parts by weight of a solvent mixture comprising (1) from 60 to 90 parts by weight of water and (2), correspondingly, from 40 to 10 parts by weight of an organic cosolvent selected from the class consisting of 2-(n-propoxy)-propan-1-ol, 2-(n-butoxy)-propan-1-ol, 1-(n-propoxy)-propan-2-ol, 1-(n-butoxy)-propan-2-ol, and mixtures thereof,
   said styrene monomer being selected from the group consisting of styrene, alpha-alkyl styrenes, ring-substituted alkyl styrenes, alpha-alkyl ring-substituted alkyl styrenes, halo-styrenes, haloalkyl styrenes, and mixtures thereof; said allyl alcohol monomer being selected from the group consisting of allyl alcohol, methallyl alcohol, chlorallyl alcohol, and mixtures thereof.

2. A coating composition as in claim 1 wherein the styrene monomer is styrene and the allyl alcohol monomer is allyl alcohol.

3. A coating composition as in claim 1 wherein the organic cosolvent is a mixture of 2-(n-propoxy)-propan-1-ol and 1-(n-propoxy)-propan-2-ol.

4. A coating composition as in claim 1 wherein the organic cosolvent is a mixture of 2-(n-butoxy)-propan-1-ol and 1-(n-butoxy)-propan-2-ol.

5. A coating composition comprising:
   (A) from 10 to 100 parts by weight of a water-insoluble salt of a base selected from the group consisting of alkali metal bases and amines with an adduct of (1) an alpha,beta-ethylenically unsaturated carboxylic compound and (2) a fatty acid ester of a copolymer of a styrene monomer and an allyl alcohol monomer having the structure of a co-reaction product of (a) from 0.75 to 1.25 carboxyl equivalents of fatty acid and mixtures thereof having an iodine unsaturation number by the ASTM D1467–57T test method of from about 50 to 220 and (b) 1.0 hydroxyl equivalents of a copolymer of a styrene monomer and an allyl alcohol monomer, and
   (B) 100 parts by weight of a solvent mixture comprising (1) from 60 to 90 parts by weight of water and (2), correspondingly, from 40 to 10 parts by weight of an organic cosolvent selected from the class consisting of 2-(n-propoxy)-propan-1-ol, 2-(n-butoxy)-propan-1-ol, 1-(n-propoxy)-propan-2-ol, 1-(n-butoxy)-propan-2-ol, and mixtures thereof,
   said styrene monomer being selected from the group consisting of styrene, alpha-alkyl styrenes, ring-substituted alkyl styrenes, alpha-alkyl ring-substituted alkyl styrenes, halostyrenes, haloalkyl styrenes, and mixtures thereof; said allyl alcohol monomer being selected from the group consisting of allyl alcohol, methallyl alcohol, chlorallyl alcohol, and mixtures thereof.

6. A coating composition as in claim 5 wherein the styrene monomer is styrene and the allyl alcohol monomer is allyl alcohol.

7. A coating composition as in claim 5 wherein the organic cosolvent is a mixture of 2-(n-propoxy)propan-1-ol and 1-(n-propoxy)-propan-2-ol.

8. A coating composition as in claim 5 wherein the organic cosolvent is a mixture of 2-(n-butoxy)-propan-1-ol and 1-(n-butoxy)-propan-2-ol.

9. A coating composition comprising:
   (A) from 10 to 100 parts by weight of a water-insoluble salt of a base selected from the group consisting of alkali metal bases and amines with an adduct of (1) a material selected from the group consisting of maleic and fumaric acids and their anhydrides and (2) a fatty acid ester of a copolymer of a styrene monomer and an allyl alcohol monomer having the structure of a coreaction product of (a) from 0.75 to 1.25 carboxyl equivalents of soya fatty acids and (b) 1.0 hydroxyl equivalents of a copolymer of a styrene monomer and an allyl alcohol monomer, and,
   (B) 100 parts by weight of a solvent mixture comprising (1) from 60 to 90 parts by weight of water and (2), correspondingly, from 40 to 10 parts by weight of an organic cosolvent selected from the class consisting of 2-(n-propoxy)-propan-1-ol, 2-(n-butoxy)-propan-1-ol, 1-(n-propoxy)-propan-2-ol, 1-(n-butoxy)-propan-2-ol, and mixtures thereof,
   said styrene monomer being selected from the group consisting of styrene, alpha-alkyl styrenes, ring-substituted alkyl styrenes, alpha-alkyl ring-substituted alkyl styrenes, halo-styrenes, haloalkyl styrenes, and mixtures thereof; said allyl alcohol monomer being selected from the group consisting of allyl alcohol, methallyl alcohol, chlorallyl alcohol, and mixtures thereof.

10. A coating composition as in claim 9 wherein the styrene monomer is styrene and the allyl alcohol monomer is allyl alcohol.

11. A coating composition as in claim 9 wherein the organic cosolvent is a mixture of 2-(n-propoxy)-propan-1-ol and 1-(n-propoxy)-propan-2-ol.

12. A coating composition as in claim 9 wherein the organic cosolvent is a mixture of 2-(n-butoxy)-propan-1-ol and 1-(n-butoxy)-propan-2-ol.

References Cited

UNITED STATES PATENTS 3,251,790   5/1966   Christenson et al. _____ 260—23

OTHER REFERENCES

Curme et al., Glycols, Reinhold Publishing Corp., 1952, pp. 262–265.

MURRAY TILLMAN, *Primary Examiner.*

J. ZIEGLER, J. WHITE, *Assistant Examiners.*